US012743636B2

(12) United States Patent
Zayats et al.

(10) Patent No.: US 12,743,636 B2
(45) Date of Patent: Sep. 22, 2026

(54) CONTINUOUS KNOWLEDGE GRAPH FOR LINKS AND WEIGHT PREDICTIONS

(71) Applicant: INTERNATIONAL BUSINESS MACHINES CORPORATION, Armonk, NY (US)

(72) Inventors: Mykhaylo Zayats, Dublin (IE); Sergiy Zhuk, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 754 days.

(21) Appl. No.: 17/456,750

(22) Filed: Nov. 29, 2021

(65) Prior Publication Data

US 2023/0169358 A1 Jun. 1, 2023

(51) Int. Cl.
*G06N 5/022* (2023.01)

(52) U.S. Cl.
CPC .................................... *G06N 5/022* (2013.01)

(58) Field of Classification Search
CPC ........... G06N 5/022; G06N 5/02; G06N 5/01; G06N 3/04; G06N 3/08
See application file for complete search history.

(56) References Cited

U.S. PATENT DOCUMENTS 10,157,226 B1 * 12/2018 Costabello ............ G06N 5/022
2018/0089383 A1 3/2018 Allen et al.
2019/0122111 A1 * 4/2019 Min ...................... G06N 5/022
2020/0034465 A1 1/2020 Brake et al.
2020/0160121 A1 5/2020 Parasrampuria et al.
2020/0160215 A1 5/2020 Kotnis et al.
2020/0218988 A1 7/2020 Boxwell et al.
2022/0129766 A1 * 4/2022 Potts ...................... G06N 5/022

FOREIGN PATENT DOCUMENTS

CN 109036546 A 12/2018

OTHER PUBLICATIONS

Li, Zhifei, et al. “Learning knowledge graph embedding with heterogeneous relation attention networks.” IEEE Transactions on Neural Networks and Learning Systems 33.8 (2021): 3961-3973. (Year: 2021).*

Safavi et al., “Improving the Utility of Knowledge Graph Embeddings with Calibration”, Publication, arXiv:2004.01168v1, Apr. 2020, (p. 17).

Costabello et al., “AmpliGraph: A Library for Representation Learning on Knowledge Graphs”, Mar. 2019, https://doi.org/10.5281/zenodo.2595043, (p. 4).

Li et al., “PGCN: Disease gene prioritization by disease and gene embedding through graph convolutional neural networks”, https://doi.org/10.1101/532226, Cold Spring Harbor Laboratory, bioRxiv, Published 2019, (p. 9).

(Continued)

*Primary Examiner* — Kamran Afshar
*Assistant Examiner* — Brian J Hales
(74) *Attorney, Agent, or Firm* — Anthony Curro

(57) ABSTRACT

Embodiments are provided for providing a continuous knowledge graph in a computing system by a processor. One or more weighted values of an edge between a pair of entities in a knowledge graph may be predicted based on one or more candidate statements. A confidence score may be generated for the one or more predicted weighted values.

17 Claims, 9 Drawing Sheets

(56) References Cited

OTHER PUBLICATIONS

Gesese et al., "A Comprehensive Survey of Knowledge Graph Embeddings with Literals: Techniques and Applications", Proceedings of the Workshop on Deep Learning for Knowledge Graphs (DL4KG), co-located with of the 16th Extended Semantic Web Conference (ESWC 2019), 2019, (p. 10).
Cao, S. et al., GraRep: Learning Graph Representations with Global Structural Information, Proceedings of ACM, Oct. 19-23, 2015, 10 pages.
Duran, et al., Kblrn: End-to-End Learning of Knowledge Base Representations with Latent, Relational, and Numerical Features, arXiv: 1709.04676v3 [cs.Al] , Jun. 11, 2018, 10 pages.
Gao, et al., Edge2vec: Representation Learning Using Edge Semantics For Biomedical Knowledge Discovery, BMC Bioinformatics, Jun. 10, 2019, 15 pages.
Kristiadi, A. et al. Incorporating Literals into Knowledge Graph Embeddings, arXiv:1802.00934v3 [cs.Al], Jul. 18, 2019, 9 pages.
Mai, G. et al., Support and Centrality: Learning Weights for Knowledge Graph Embedding Models, KEKM, Nov. 2018, 26 pages.
Nickel, et al., A Review of Relational Machine Learning for Knowledge Graphs, arXiv:1503.00759, Sep. 28, 2015, 23 pages.
Tay, Y. et al., Multi-Task Neural Network for Non-discrete Attribute Prediction in Knowledge Graphs, Proceedings of CIKM, Aug. 16, 2017, 10 pages.
Wu, et al., Knowledge Graph Embedding with Numeric Attributes of Entities, Proceedings of the Third Workshop on Representation Learning for NLP, , Jul. 20, 2018, pp. 132-136.

* cited by examiner

CONTINUOUS KNOWLEDGE GRAPH FOR LINKS AND WEIGHT PREDICTIONS

BACKGROUND OF THE INVENTION

Field of the Invention

The present invention relates in general to computing systems, and more particularly, to various embodiments for providing a continuous knowledge graph for links and weigh predictions by a processor.

Description of the Related Art

In today's society, consumers, businesspersons, educators, and others communicate over a wide variety of mediums in real time, across great distances, and many times without boundaries or borders. With the increased usage of computing networks, such as the Internet, humans are currently inundated and overwhelmed with the amount of information available to them from various structured and unstructured sources. Due to the recent advancement of information technology and the growing popularity of the Internet, a wide variety of computer systems have been used in machine learning. Machine learning is a form of artificial intelligence ("AI") that is employed to allow computers to evolve behaviors based on empirical data.

SUMMARY OF THE INVENTION

According to an embodiment of the present invention, a method for providing a continuous knowledge graph for links and weight predictions in a computing environment, by one or more processors, is depicted. One or more weighted values of an edge between a pair of entities in a knowledge graph may be predicted based on one or more candidate statements. A confidence score may be generated for the one or more predicted weighted values.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments are provided.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
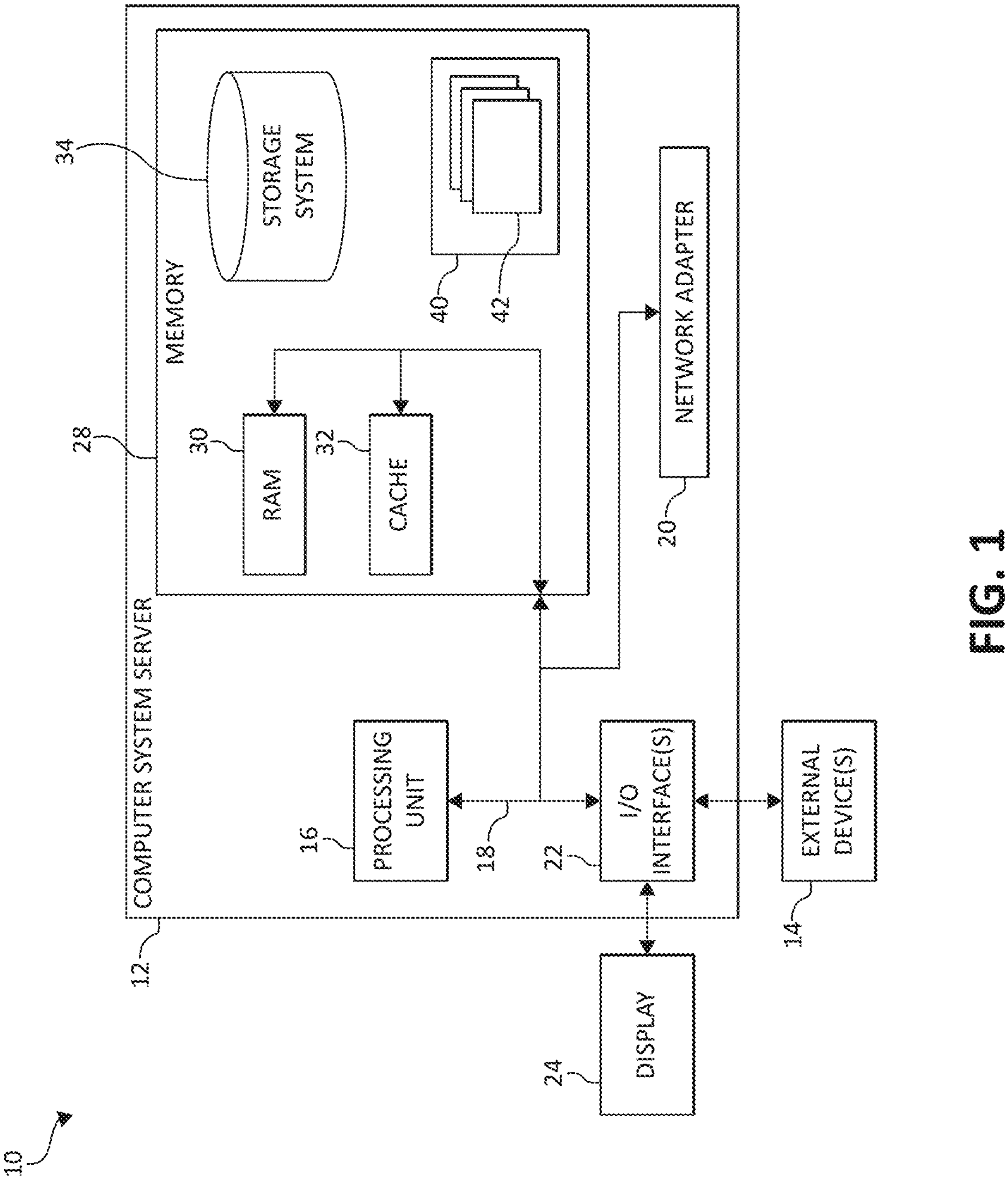
FIG. 1 is a block diagram depicting an exemplary cloud computing node according to an embodiment of the present invention.

The present invention relates generally to knowledge graph databases in a computing environment. In knowledge graph databases, stored information is represented by means of a knowledge graph which has nodes interconnected by edges. Nodes of the graph represent entities for which entity data, characterizing those entities, is stored in the database. Entities may, for example, correspond to people, companies, devices, etc. More generally, nodes may represent any entity (real or abstract) for which information needs to be stored. The entity data stored for a node may comprise one or more data items, often called "properties" or "property values", describing particular features of an entity. Edges of the graph represent relationships between entities. An edge connecting two nodes of the graph represents some defined relationship which is applicable to the entities represented by those nodes. A graph may accommodate different relationships between entities, with each edge having a specified type, indicated by an edge name or "label", signifying the particular relationship represented by that edge. Nodes may also have associated names, or labels, to indicate different types or categories of node corresponding to different entity-types represented in the graph.

Knowledge graphs provide highly efficient structures for representing large volumes of diverse information about interrelated entities. Querying a knowledge graph database involves formulating a query request defining the information needed from the database in such a way that relevant nodes, edges, and properties can be identified, and then following edges in the graph to identify and extract the required data from storage. Knowledge graphs can be conveniently represented using matrices in which non-zero entries signify edges and rows, and column indices correspond to node identities. The process of identifying and extracting data for a query request can be implemented by performing mathematical operations on such matrices.

Thus, modeling information as a Knowledge Graph is an operation in many domains for predicting or discovering new insights from data. A type of computational models designed to automate prediction process are Knowledge Graph Embeddings (KGE) operations. Corresponding vector representations may be constructed for each entity in the graph and then employ link prediction procedure to discover new facts. Current KGE operations are designed for graphs with non-weighted edges and although there are extensions, which allow incorporating weights into the model they are limited to unary relations and do not preserve numerical properties and weight semantics. This is a severe limitation of KGE models that does not allow for accurate representation of numerical literals.

Accordingly, in some implementations, the present invention provides a solution for computational model of a knowledge graph called "continuous KGE" that supports numerical attributes as weighted edges. The computational model of a knowledge graph allows incorporation of different properties of numerical literals into the computational model and then predicting the edge's weights together with a confidence level for candidate statements and select statements with the highest weight and confidence.

In some implementations, the present disclosure provides an intelligent system for providing a continuous knowledge graph (e.g., a weighted knowledge graph or "continuous KG") for links and weight predictions in a computing environment. One or more weighted values of an edge between a pair of entities in a knowledge graph may be predicted based on one or more candidate statements. A confidence score may be generated for the one or more predicted weighted values.

In some implementations, the present disclosure analyzes and identifies metadata that describes numerical properties of weights. One or more vector functions are generated representing relations. A pair of numbers such as, for example, two numbers: 1) edge weight, and 2) a confidence level for each candidate statement, are provided. That is, a vector of weights may be predicted and a confidence score may be generated where the confidence score is one number for that vector of weights.

In other implementations, the present disclosure provides for previously unknown relations between entities and provides numerical values incorporation into knowledge graph, which preserves numerical properties of those values. An enhanced links prediction is provided with confidence score. The enhanced link prediction operation may be used to identify one or many new links between two concepts in the continuous knowledge graph that are strongly related, yet have no observed link between them. Those links are predicted together with their weights and the corresponding confidence scores. The new links may go in both directions, depending on the level of confidence scores and how such confidence compares against others in the neighborhood. For example, if concepts A and B are strongly related for some values of weights, a link and the corresponding weight from B to A is identified and presented with a high level of confidence.

In other implementations, the numerical properties of weights may be preserved by choosing corresponding design of relation embedding functions and process multidimensional numerical values. The present disclosure may extend to incorporate, not only numerical literals, but other modalities and provide for link prediction in large heterogeneous multi-modal (including numerical values) data.

It should be noted as described herein, the term "intelligent" (or "cognitive/cognition") may be relating to, being, or involving conscious intellectual activity such as, for example, thinking, reasoning, or remembering, that may be performed using a machine learning. In an additional aspect, cognitive or "intelligent may be the mental process of knowing, including aspects such as awareness, perception, reasoning and judgment. A machine learning system may use artificial reasoning to interpret data from one or more data sources (e.g., sensor based devices or other computing systems) and learn topics, concepts, and/or processes that may be determined and/or derived by machine learning.

In an additional aspect, cognitive or "intelligent" may refer to a mental action or process of acquiring knowledge and understanding through thought, experience, and one or more senses using machine learning (which may include using sensor based devices or other computing systems that include audio or video devices). Cognitive/intelligent may also refer to identifying patterns of behavior, leading to a "learning" of one or more events, operations, or processes. Thus, the intelligent model may, over time, develop semantic labels to apply to observed behavior and use a knowledge domain or ontology to store the learned observed behavior. In one embodiment, the system provides for progressive levels of complexity in what may be learned from the one or more events, operations, or processes.

In an additional aspect, the term intelligent may refer to an intelligent system. The intelligent system may be a specialized computer system, or set of computer systems, configured with hardware and/or software logic (in combination with hardware logic upon which the software executes) to emulate human cognitive functions. These intelligent systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. An intelligent system may perform one or more computer-implemented intelligent operations that approximate a human thought process while enabling a user or a computing system to interact in a more natural manner. An intelligent system may use AI logic, such as NLP based logic, for example, and machine learning logic, which may be provided as specialized hardware, software executed on hardware, or any combination of specialized hardware and software executed on hardware. The logic of the intelligent system may implement the intelligent operation(s), examples of which include, but are not limited to, question answering, identification of related concepts within different portions of content in a corpus, and intelligent search algorithms, such as Internet web page searches.

In general, such intelligent systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and intelligent; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human intelligent based on experiences.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
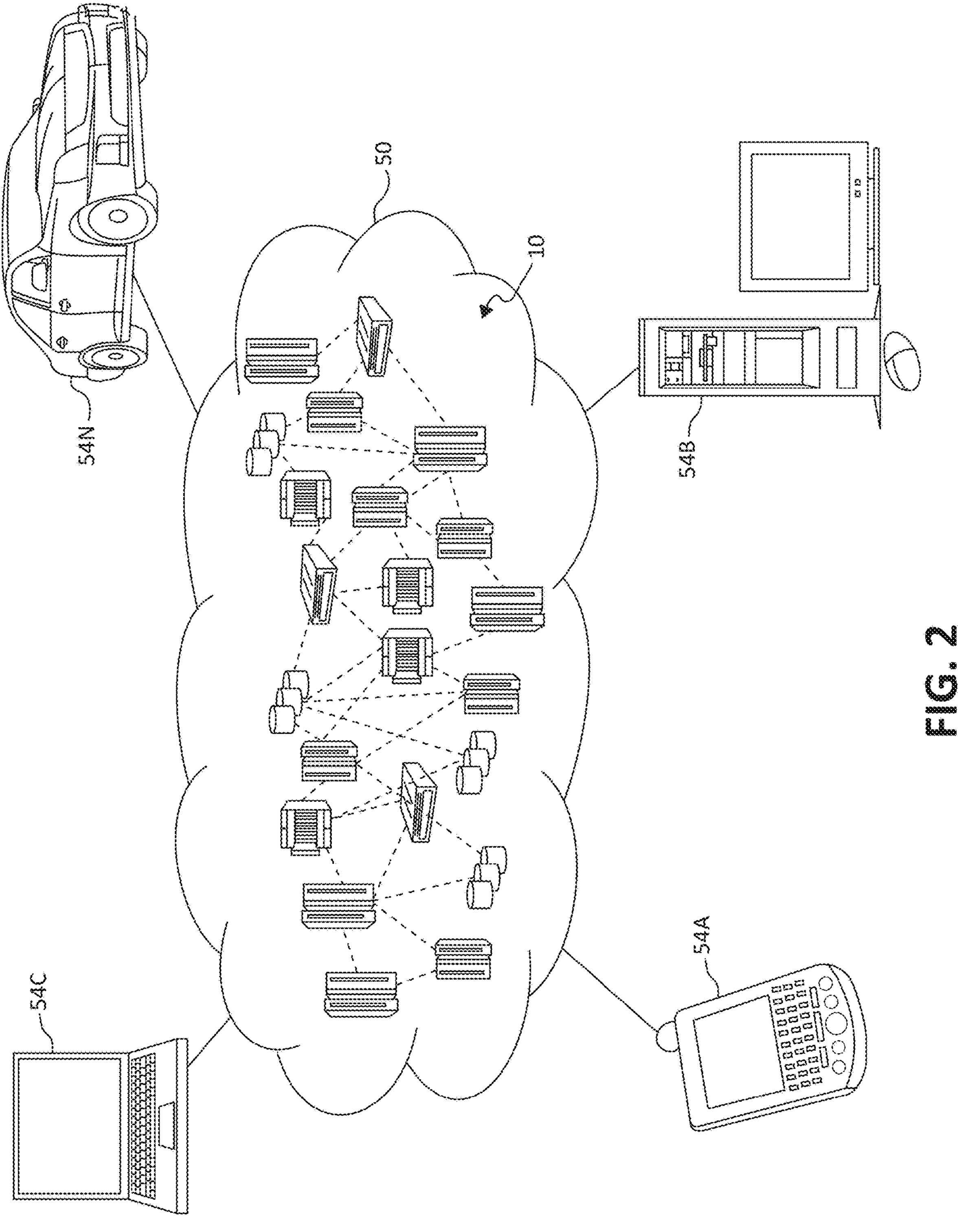
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
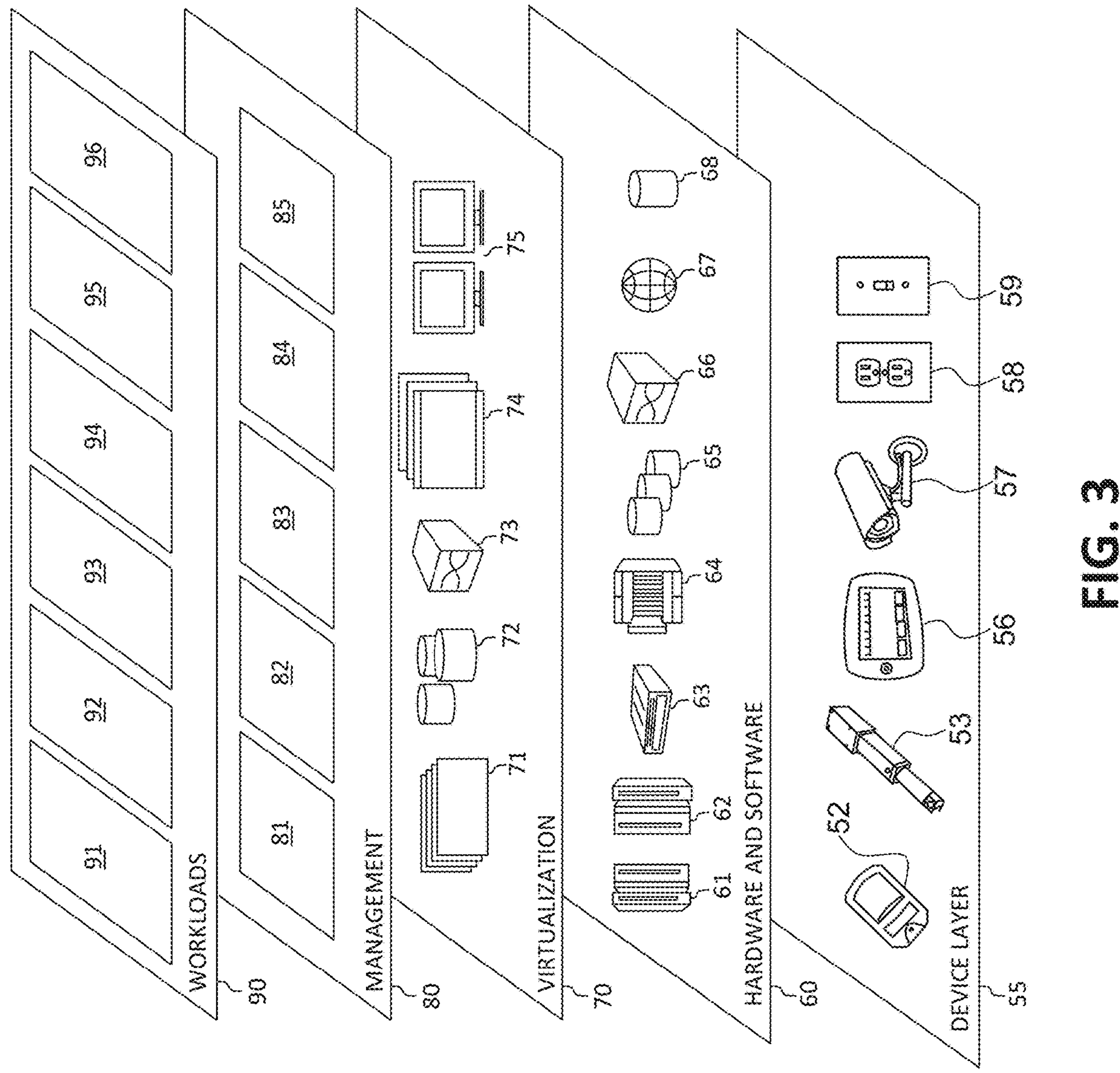
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for providing a continuous knowledge graph. In addition, workloads and functions 96 for providing a continuous knowledge graph may include such operations as data analytics, data analysis, and as will be further described, notification functionality. One of ordinary skill in the art will appreciate that workloads and functions 96 for providing a continuous knowledge graph may also work in conjunction with other portions of the various abstraction layers, such as those in hardware and software 60, virtualization 70, management 80, and other workloads 90 (such as data analytics processing 94, for example) to accomplish the various purposes of the illustrated embodiments of the present invention.

Thus, as described herein, in various implementation, the present disclosure provides for continuous knowledge graph in a computing environment, by one or more processors, is depicted. One or more weighted values of an edge between a pair of entities in a knowledge graph may be predicted based on one or more candidate statements. A confidence score may be generated for the one or more predicted weighted values.

In some implementations, the present invention provides for detecting likely, yet previously unknown, weighted relations between entities based on existing weighted relations. A mathematical model is provided and used for treating numerical attributes in data such as, for example, binary (e.g., categorical) values, bounded values, unbounded values, values sampled from statistical distributions. Heterogeneous weighted metarelational graph and a knowledge graph embedding model is used and employed.

In some implementations, knowledge graph embeddings are used and take into account numerical values for entities and provide a prediction of continuous weights of relations in KGE settings. More specifically, mechanisms of the illustrated embodiments provide mathematical formalism for KGE learning which i) incorporates weights directly into the embeddings learning procedure, and ii) preserves numerical properties and semantics of weighted relations. An extension to a KGE link prediction procedure that predicts weights as well as the confidence level of that weight.

Figure 4:
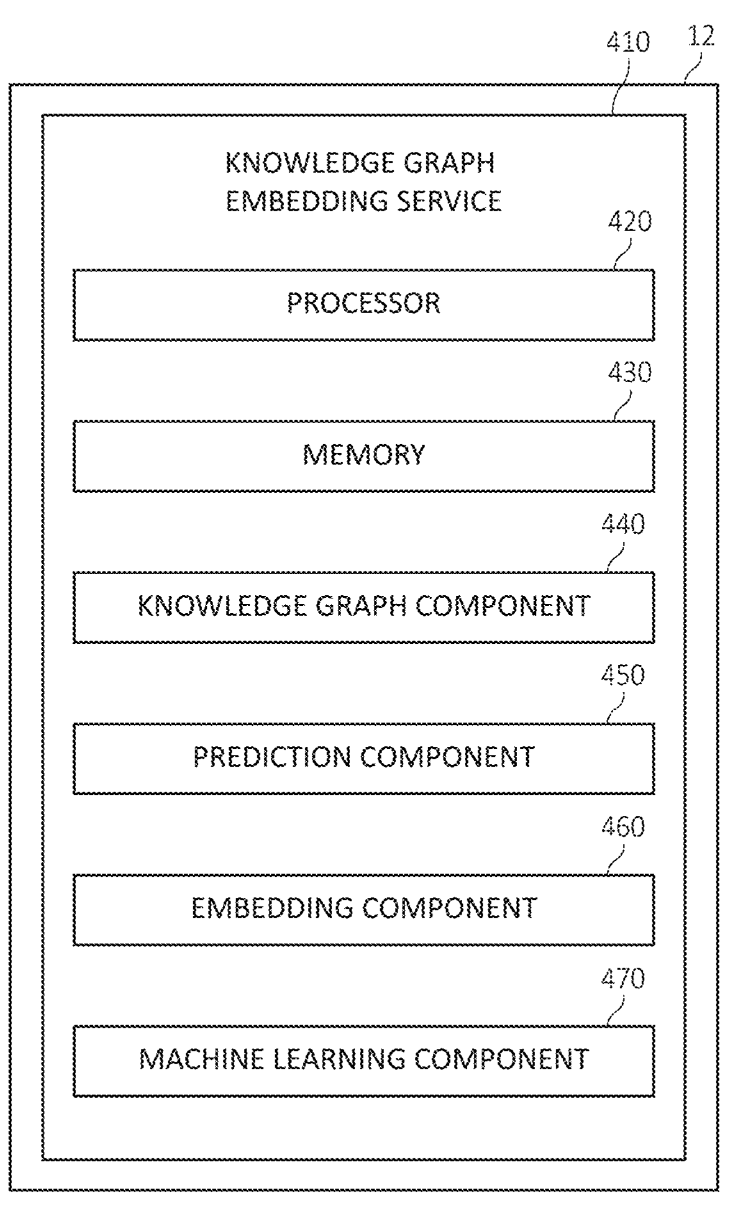
FIG. 4 is an additional block diagram depicting an exemplary functional relationship between various aspects of the present invention.

Turning now to FIG. 4, a block diagram depicting exemplary functional components of system 400 for providing a continuous knowledge graph in a computing environment according to various mechanisms of the illustrated embodiments is shown. In one aspect, one or more of the components, modules, services, applications, and/or functions described in FIGS. 1-3 may be used in FIG. 4. As will be seen, many of the functional blocks may also be considered "modules" or "components" of functionality, in the same descriptive sense as has been previously described in FIGS. 1-3.

In one aspect, the computer system/server 12 may provide virtualized computing services (i.e., virtualized computing, virtualized storage, virtualized networking, etc.) to the intelligent conversational agent management and interaction service 402 and the conversation agent 404. More specifically, the computer system/server 12 may provide virtualized computing, virtualized storage, virtualized networking and other virtualized services that are executing on a hardware substrate.

A knowledge graph embedding service 410 is shown, incorporating processing unit 420 ("processor") to perform various computational, data processing and other functionality in accordance with various aspects of the present invention. In one aspect, the processor 420 and memory 430 may be internal and/or external to the knowledge graph embedding service 410, and internal and/or external to the computing system/server 12. The knowledge graph embedding service 410 may be included and/or external to the computer system/server 12, as described in FIG. 1. The processing unit 420 may be in communication with the memory 430. The knowledge graph embedding service 410 may include a knowledge graph component 440, a prediction component 450, an embedding component 460, and a machine learning component 470.

In one aspect, the system 400 may provide virtualized computing services (i.e., virtualized computing, virtualized storage, virtualized networking, etc.). More specifically, the system 400 may provide virtualized computing, virtualized storage, virtualized networking and other virtualized services that are executing on a hardware substrate.

The knowledge graph embedding service 410, in association with the knowledge graph component 440, the prediction component 450, the embedding component 460, and the machine learning component may predict one or more weighted values of an edge between a pair of entities in a knowledge graph based on one or more candidate statements and generate a confidence score for the one or more predicted weighted values.

The knowledge graph embedding service 410, in association with the knowledge graph component 440, the prediction component 450, the embedding component 460, and the machine learning component may define the one or more weighted values to represent a predicted, unknown relationship between the pair of entities based on existing weighted relationships between one or more of a plurality of entities in the knowledge graph.

In some implementations, the knowledge graph component 440 may select the one or more weighted values of the edge between the pair of entities having a maximum confidence score based on the one or more candidate statements. The prediction component 450 may analyze metadata between a plurality of entities in the knowledge graph where the metadata includes numerical weights of each of the plurality of entities in the knowledge graph.

The embedding component 460, in association with the knowledge graph component 440, may incorporate numerical weights of one or more of entities in the knowledge graph into knowledge graph embeddings ("KGE"), where embedding the numerical weights of the one or more of the plurality of entities of the knowledge graph includes embedding the plurality of entities and relationships into continuous vector spaces.

The knowledge graph embedding service 410, in association with the knowledge graph component 440, the prediction component 450, the embedding component 460, and/or the machine learning component 470 may generate one or more vector functions for each one of the plurality of entities in the knowledge graph.

The knowledge graph embedding service 410, in association with the knowledge graph component 440, the prediction component 450, the embedding component 460, and/or the machine learning component 470 may generate one or more vector functions representing a relationship between each one of the plurality of entities in the knowledge graph.

In some implementations, the machine learning component 470 may learn latent embeddings of a Knowledge Graphs ontology. More specifically, the machine learning component 470 may learn when relations in a knowledge graph are given with weights and provide a model that incorporates those weights into a KGE model by preserving its numerical properties. Also, the knowledge graph embedding service 410, in association with the knowledge graph component 440, the prediction component 450, the embedding component 460, and/or the machine learning component 470 may use a link prediction procedure to predict triple weight as well as a confidence score of that weight.

The machine learning component 470 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5A:
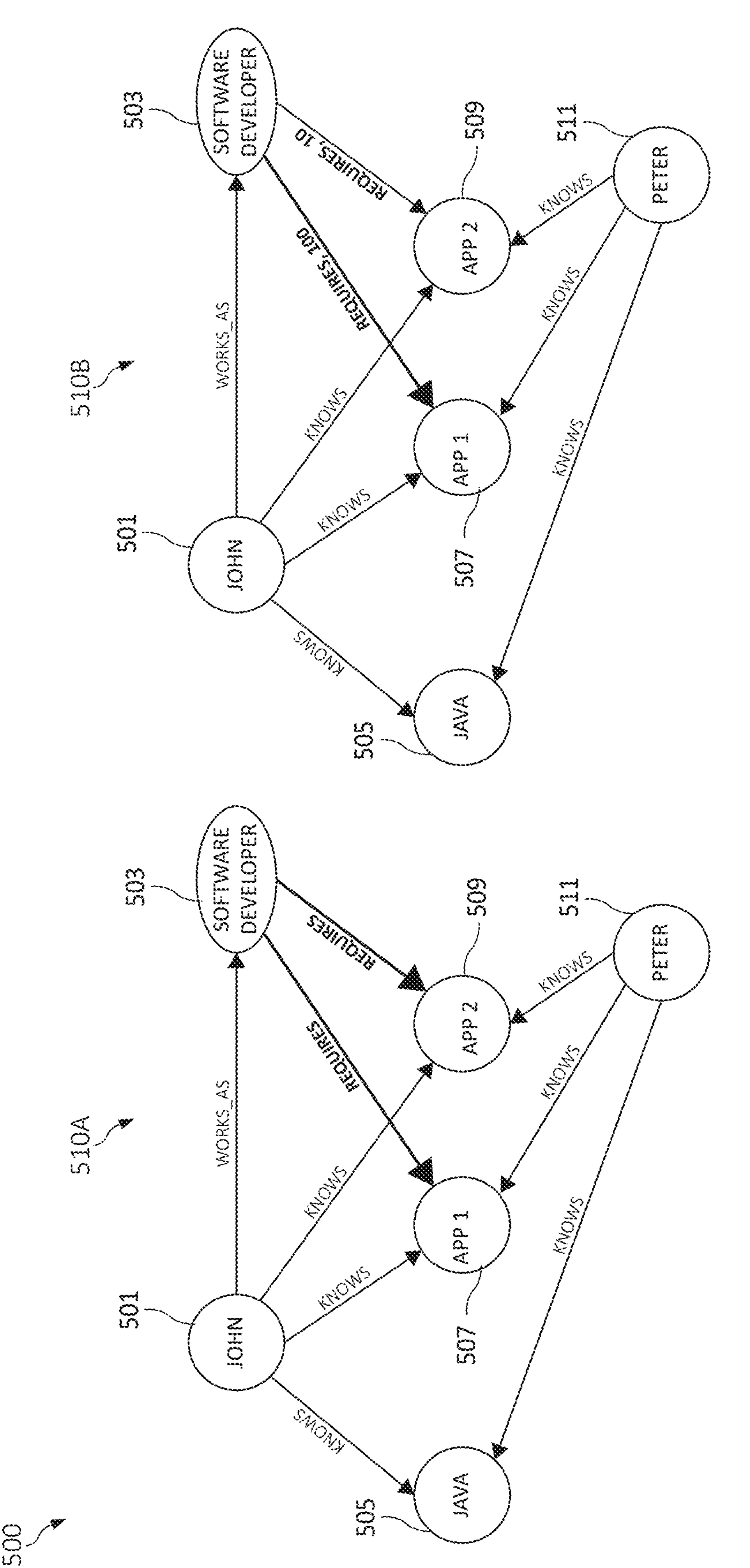
FIG. 5A-5B are block diagrams depicting a continuous knowledge graph in a computing environment according to an embodiment of the present invention.
Figure 5B:
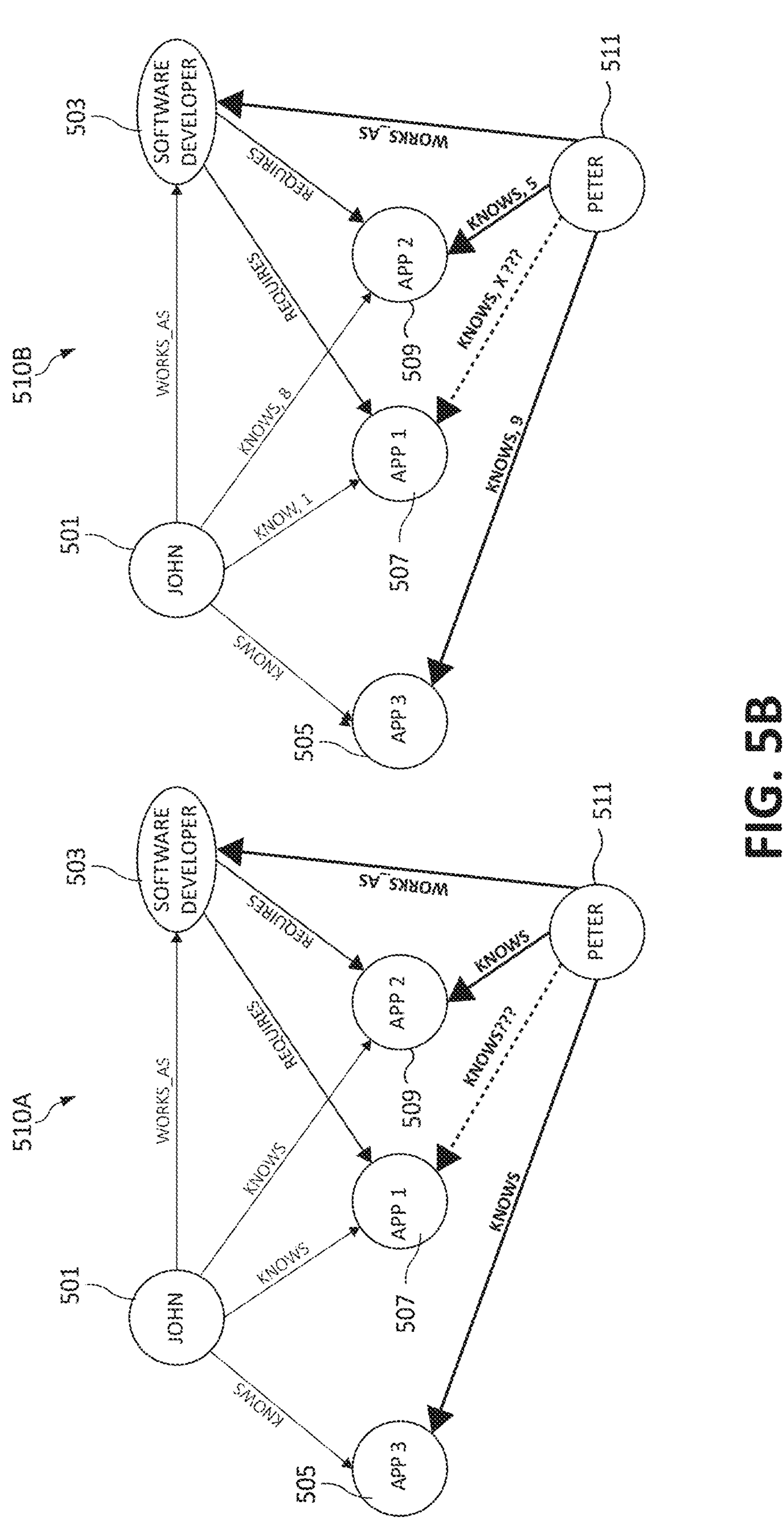

For further explanation, FIGS. 5A-5B are block diagrams depicting a continuous knowledge graph is depicted. As shown, the various functionality, or "modules" of functionality, hardware devices, and/or other components in the same descriptive sense as has been previously described in FIGS. 1-4 may be included in FIGS. 5A-5B. In one aspect, one or more of the components, modules, services, applications, and/or functions described in FIGS. 1-3 may be used in FIG. 5A-5B. Repetitive description of like elements employed in other embodiments described herein is omitted for sake of brevity.

FIG. 5A-5B depicts an exemplary knowledge graph (KG) 500, which may represent a whole knowledge graph or at least a portion of a larger overall knowledge graph according to some embodiments. By way of example only, KG 500 is depicted as 510A and 510B to describe the various embodiments and operations of KG 500. Accordingly, in general, reference to KG 500 may refer to either 510A, 510B, or both.

The KG 500 includes nodes 501-511, and edges in-between that connect the nodes 101-108. Each of the nodes 501-511 represent a concept, while the edges between the nodes 501-511 describes a relationship between the connected nodes 501-511. The KG 500 may be interpreted as a collection of facts represented by specific data triples. Each triple is an atomic unit of knowledge for the KG 500 that includes three data points that are connected on the KG 500. A triple may take the form of {subject, predicate, object}. An exemplary triple from the KG 500 includes: {John, Knows, application ("App") 1}, {Software developer, requires, App 2}, {Peter, knows, App 3}, and so forth.

To further illustrate, consider the following example of KG 500 as depicted in FIG. 5A. Assume KG 500 has collected data representing job descriptions for a "software developer" 503. The software developer" 503 is required to know one or more types of software programming languages/programs (hereinafter application or "app"). Thus, first, assume the data suggests that "App 1" 507 is much more frequently "required" then app 2 509. This statistical evidence would be ignored by non-weighted KGE of KG510A (as depicted in the edges of KG 510A) leading to an inaccurate representation of "software developer" 503 entity. While weighted KGE of a continuous KG 510B (as depicted in the edges of the continuous KG 510B) would take this statistical evidence into account. Second, numerical weights may describe different literals and are numerically distributed in different ways, which is important for a computational model to preserve numerical properties of those weights. These numerical weights are depicted in the edges of KG 510B such as, for example, numerical value "10" assigned to the software developer 503 as a requirement to know App 2 509. The numerical value "100" assigned to the software developer 503 as a requirement to know App 1 507.

Turning now to FIG. 5B, assume it is required to predict if a candidate statement (e.g., <Peter, knows, Python>) is true. As such, first, the non-weighted KGE models of KG510A (as depicted in the edges of KG 510A) would consider "Peter" 511 to be very similar to "John" 501 and would predict the candidate statement to be true. However, the continuous KGE model, which incorporates weights of the continuous KG 510B (as depicted in the edges of the continuous KG 510B), would determine that "Peter" 511 is unique and distinct to "John" 501 and should predict a weight for a statement (e.g., "Peter", knows_"x", App 1">) based on other candidates with high level of knowledge of "App 3" 505 and who work as a software developer 503.

That is, the prediction is based on the incorporated weights of the continuous KG 510B. For example, the numerical value "9" is assigned to Peter 511 as a degree of knowing or having a knowledge of App 3 505. The numerical value "5" is assigned to Peter 511 as a degree of knowing or having a knowledge of App 2 509. The numerical value "1" is assigned to John 501 as a degree of knowing or having a knowledge of App 1 507. The numerical value "8" is assigned to John 501 as a degree of knowing or having a knowledge of App 2 509.

Figure 6:
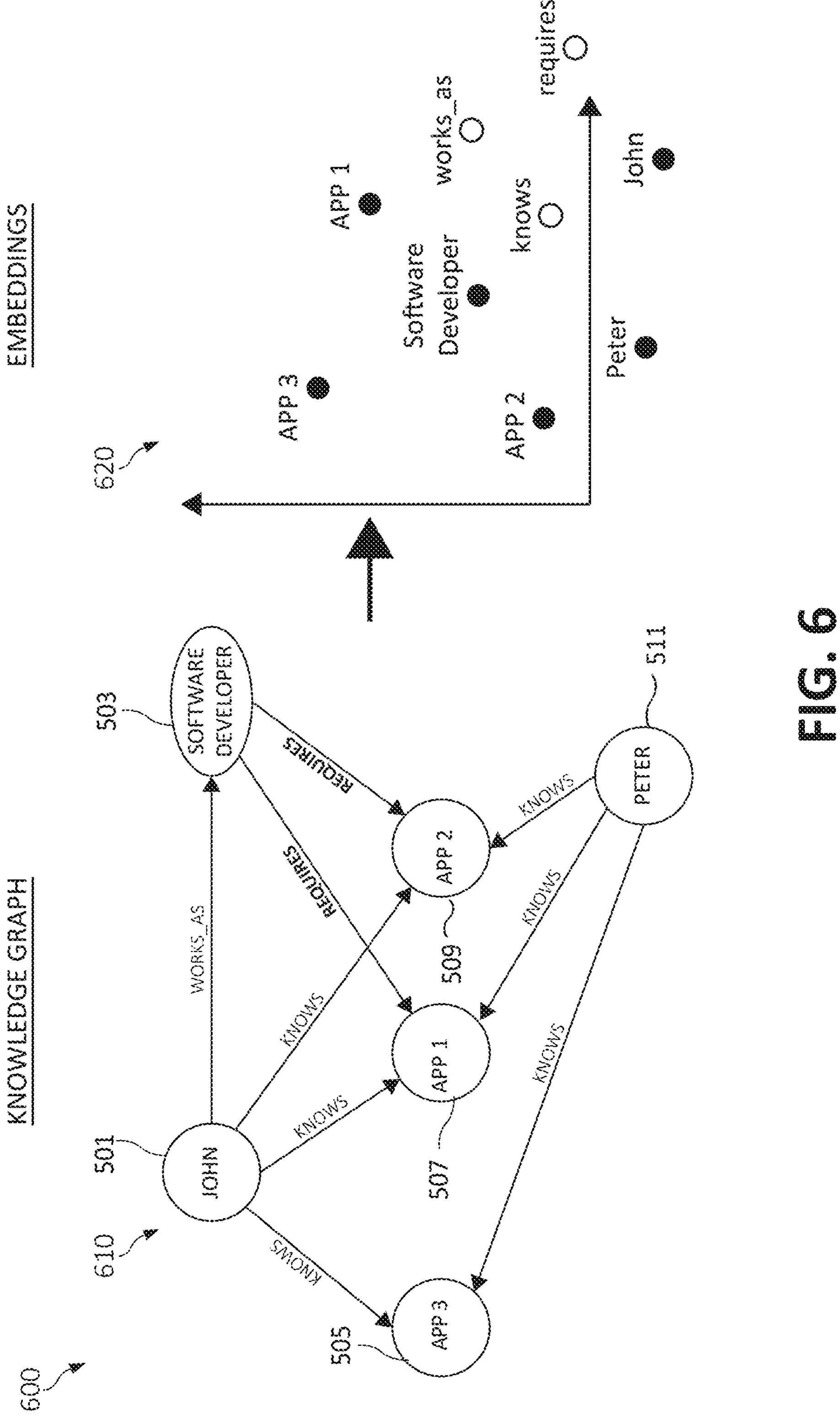
FIG. 6 is block diagram depicting operations for providing a continuous knowledge graph for links and weigh predictions in a computing environment according to an embodiment of the present invention.

For further explanation, FIG. 6 is block diagram depicting operations for providing a continuous knowledge graph in a computing environment according to an embodiment of the present invention. As will be seen, many of the functional blocks may also be considered "modules" of functionality, in the same descriptive sense as has been previously described in FIGS. 1-5A-5B. Repetitive description of like elements employed in other embodiments described herein is omitted for sake of brevity.

That is, FIG. 6 depicts the Knowledge Graph Embeddings (KGE) operations, which is a computational operation which converts Knowledge Graph ontologies into vector representations. As depicted, from the KG 600 input, the KG 600 outputs an embeddings space 620, where the embeddings space 620 includes point coordinates that represent each of the data points included in the KG 600 (e.g., nodes and/or edges from the KG 600). In one aspect, the KGE embeddings space 620 may be a metric space (e.g., Cartesian space) having one or more dimensions, and is a representation of a trained embeddings space that includes point coordinate representations of the data of the KG 600.

In some implementations, the KGE embeddings space 620 is depicted as having two dimensions. However, the KGE embeddings space 620 may include additional dimensions. Within the KGE embeddings space 620, are point coordinates that represent the data points from the KG 600. According to some embodiments, the KGE embeddings space 620 may include point coordinates for some, or all, of the data included in the KG 600. By converting the KG 600 into the KGE embeddings space 620, the resulting coordinate values are representative of the data from the KG 600, which may now be analyzed using the KGE model operation to predict the weighted values of an edge between a pair of entities in a knowledge graph based on one or more candidate statements, generate a confidence score for the one or more predicted weighted values.

To further illustrate, the KGE model may be defined as follows. In one aspect, the knowledge graph such as, for example, knowledge graph 600 may be set of triples (s, p, o) (e.g., subject, predict, object) such as, for example, ("John", "works_as", "software_developer"). A negatives generation strategy may be applied such as, for example ("John", "works_as", "manager"). The embedding initialization may be as follows:

$$s \to e_s,\ p \to e_p,\ o \to e_o,\ \ \theta \to e_s, \tag{1}$$

where s is the subject, p is the predicate, o is the object, and e is the embeddings. A scoring function may then be used to generate a confidence score for the one or more predicted weighted values such as, for example, in the following equation of the function:

$$f(e_s, e_p, o_e) \to [0, 1] \tag{2}$$
$$f_{DistMult}(e_s, e_p, o_e) = f(t; \theta) = \sigma(<e_s, e_p, o_e>),$$

where σ is a sigmoid function used in machine learning for normalization (e.g., returns a value in the range of 0 to 1). A loss function may be applied such as, for example, the follow equation:

$$\theta\{e_s, e_p, o_e\},\ L_{pairwise}(\theta) = \sum_{t} + \sum_{t^-} \max(0, [\gamma + f(t^-; \theta) - f(t^+; \theta)]. \quad (3),$$

where γ is a regularization parameter (e.g., it is some positive number), t represents a triple, $t^+$ is a positive triple from observed data, $t^-$ is a negative triple obtained from running negative generation strategy, and $L_{pairwise}$—is a loss function, but different losses can be used and L denotes a loss function.

Instead of using vector predicate, $p \to e_p$, the present invention provides to model a weighted predicate by a continuous vector function parametrized by a set of basis vectors. For example, in one implementation, the continuous vector function parametrization can be achieved by one the following:

1) $p, w \to e_p(w) = f(w)e_p^o + \bar{f}(w)e_p^1$

2) $p, w \to e_p(w) = e_p^o + \bar{f}(w)e_p^1$ where the w is some number representing the weight. Alternatively, if w is represented as an N dimensional vector $w = [w_1, w_2, \ldots, w_N]$, the continuous vector function parametrization can be achieved by one of the following:

3) $p, [w] \to e_p([w]) = f(w_1, w_2, \ldots, w_N)e_p^o + \bar{f}(w_1, w_2, \ldots, w_N)e_p^1$ 4) $p, [w] \to e_p([w]) = e_p^o + \bar{f}((w_1)e_p^1 + \bar{f}((w_2)e_p^2 + \ldots + \bar{f}((w_N)e_p^N.$ A weight w would have different meaning for different relations, different application or different domains. A particular representation depends on a type of relation and distribution of a weight w being modeled. Then, a KGE learning method for vectors $$e_p^o, e_p^1, e_p^2$$

may be reused.

To further illustrate, consider the following examples. In a first example, the weight w represents number of software developers in a company. That means w is a positive number for which the upper bound is potentially unknown, i.e., w∈[0; ∞]. It is reasonable to assume that w for most of the companies would be in a region around some expected value and it is very unlikely to have companies with very large and very small number of software developers. In this example, w can be modeled as a normally distributed variable with an expected value a, and variance b. Then the corresponding vector function representing edge with w is given by using the following equations:

$$\tilde{f}(w) = \frac{1}{b\sqrt{2\pi}}\exp\left(-\frac{(w-a)^2}{2b^2}\right), \quad (5),$$

$$e_p(w) = e_p^0 + \tilde{f}(w)e_p^1, \quad (6).$$

In a second example, the weight w may represent a correlation between two entities, and thus has values within the range [0; 1], i.e., w is a binary distributed. In this case the corresponding edge vector function can be given using the following equations:

$$f(w) = \sigma\left(\frac{w}{100}\right); \tilde{f}(x) = -\sigma\left(\frac{w}{100}\right), \quad (7),$$

$$e_p(x) = f(x)e_p^0 + \tilde{f}(x)e_p^1, \quad (8).$$

In a third example, the weight w is a 2-dimensional ("2D") vector $w=[w_1; w_2]$ and the first component takes values from the interval [a; b] and the second component takes values from the interval [c; d]. And assume that components values within those interval are equally likely to occur in data. In this case a vector function of the corresponding edge is modeled using 2-dimensional uniform distribution using the following equations:

$$f(w) = \left(\frac{1}{b-a}w_1 - \frac{a}{b-a}\right)\left(\frac{1}{d-c}w_2 - \frac{c}{d-c}\right), \quad (9),$$

$$\tilde{f}(x) = \left(-\frac{1}{b-a}w_1 + \frac{b}{b-a}\right)\left(-\frac{1}{d-c}w_2 + \frac{c}{d-c}\right), \quad (10),$$

$$e_p(w) = f(w_1, w_2)e_p^0 + \tilde{f}(w_1, w_2)e_p^1, \quad (11).$$

In some implementations, a link prediction operation for extended KG embeddings model may include 1) a candidate statement (s, p, o). For representing what is the most likely weight for this statement to be correct, the following operation may apply. (It should be noted that a "most likely weight" may be a weight that is above a defined threshold, within a range of accuracy (e.g., a range of values or percentages), and/or equal to or greater than a percentage). Thus, for any weight w, the following may be computed for f (s, p(w), o):

$$\hat{w} = \text{argmax}_w f(s, p(w), o), \quad (12)$$

which is an optimal weight, and $$\hat{c} = f(s, p(\hat{w}), o), \quad (13)$$

which is a confidence of a weight.

Figure 7:
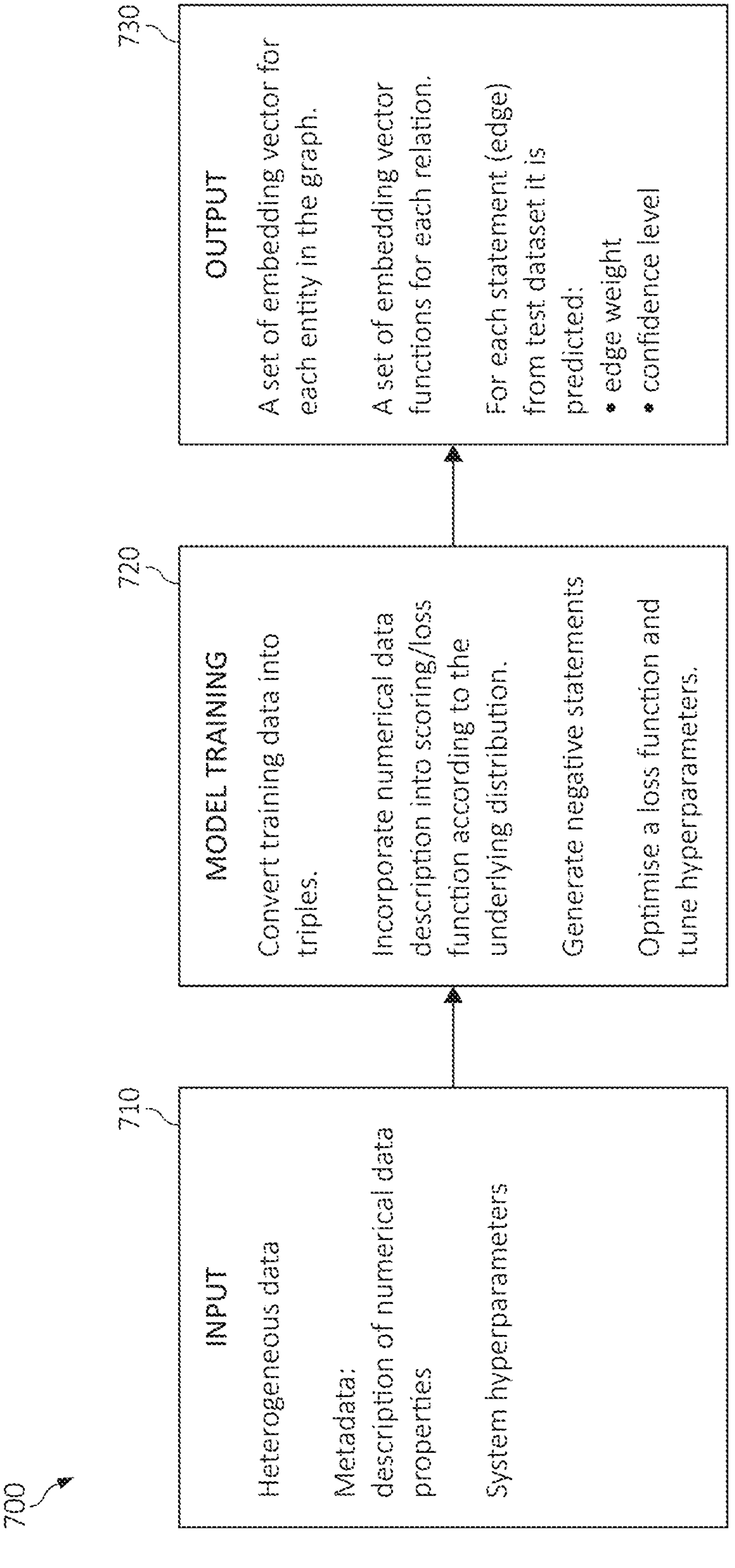
FIG. 7 is a block flow diagram depicting an additional exemplary operations for providing a continuous knowledge graph for links and weigh predictions in a computing environment according to an embodiment of the present invention.

For further explanation, FIG. 7 is a block flow diagram depicting an additional exemplary operations for providing a continuous knowledge graph in a computing environment according to an embodiment of the present invention. As shown, the various functionality, or "modules" of functionality, hardware devices, and/or other components in the same descriptive sense as has been previously described in FIGS. 1-6 may be included in FIG. 7. In one aspect, one or more of the components, modules, services, applications, and/or functions described in FIGS. 1-6 may be used in FIG. 7. Repetitive description of like elements employed in other embodiments described herein is omitted for sake of brevity.

Starting in block 710, heterogeneous data, metadata (e.g., a description of numerical data properties), and one or more system hyperparameters may be received (e.g., received as input and analyzed, identified, and processed). In block 720, training data may be converted into triples, numerical data description may be incorporated into a scoring/loss function according to an underlying distribution, one or more negative statements may be generated, and a loss function may be optimized while tuning one or more hyperparameters. In block 730, as output, a set of embedding vectors may be generated for each entity in the graph; a set of embedding vector functions may be generated for each relation, and, for each statement (e.g., edge) from test dataset that has been predicted, an edge weight and a confidence level may be generated.

Figure 8:
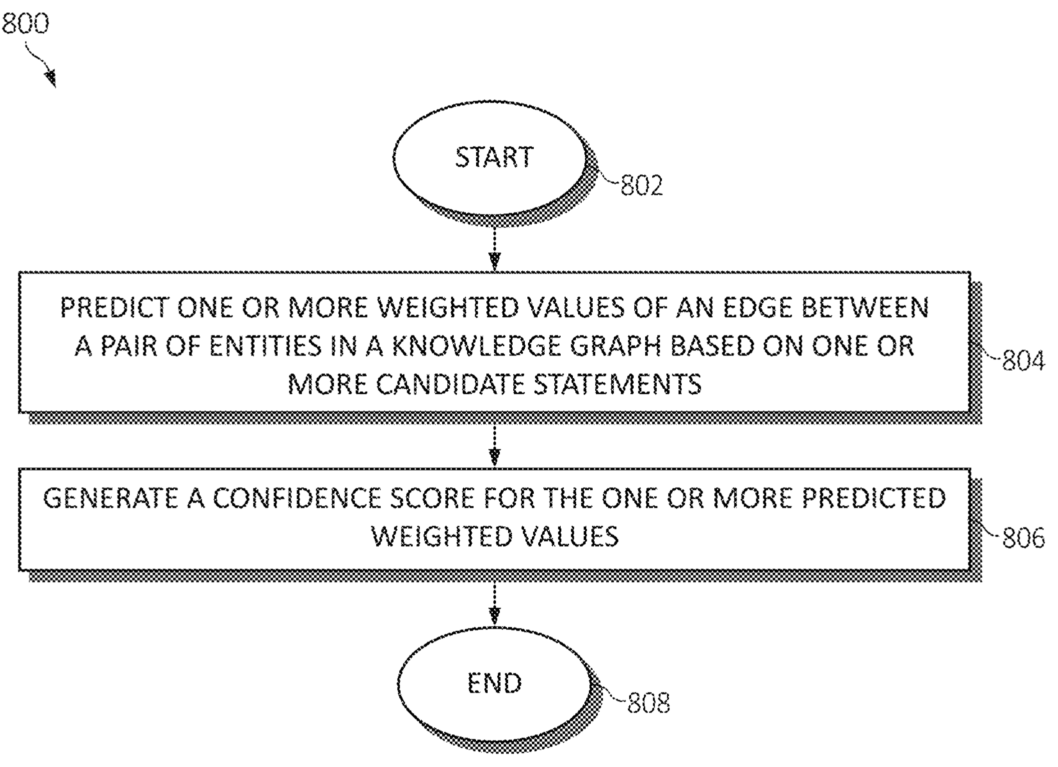
FIG. 8 is a flowchart diagram depicting an additional exemplary method for providing a continuous knowledge graph for links and weigh predictions in a computing environment according to an embodiment of the present invention.

Turning now to FIG. 8, a method 800 for providing a continuous knowledge graph by a processor is depicted, in which various aspects of the illustrated embodiments may be implemented. The functionality 800 may be implemented as a method executed as instructions on a machine, where the instructions are included on at least one computer readable medium or one non-transitory machine-readable storage medium. As one of ordinary skill in the art will appreciate, the various steps depicted in method 800 may be completed in an order or version differing from the depicted embodiment to suit a particular scenario. The functionality 700 may start in block 802.

One or more weighted values of an edge between a pair of entities in a knowledge graph may be predicted based on one or more candidate statements, as in block 804. A confidence score may be generated for the one or more predicted weighted values, as in block 806. The functionality 800 may end in block 808.

In one aspect, in conjunction with and/or as part of at least one block of FIG. 8, the operations of method 800 may include each of the following. The operations of method 800 may define one or more weighted values to represent a predicted, unknown relationship between the pair of entities based on existing weighted relationships between one or more of a plurality of entities in a knowledge graph. The operations of method 800 may select the one or more weighted values of the edge between the pair of entities having a maximum confidence score based on the one or more candidate statements.

The operations of method 800 may analyze metadata between a plurality of entities in the knowledge graph, wherein the metadata includes numerical weights of each of the plurality of entities in the knowledge graph.

The operations of method 800 may incorporate numerical weights of the one or more of the plurality of entities in the knowledge graph into knowledge graph embeddings ("KGE"), wherein embedding the numerical weights of the one or more of the plurality of entities of the knowledge graph includes embedding the plurality of entities and relationships into continuous vector spaces.

The operations of method 800 may generate one or more vector functions for each one of the plurality of entities in the knowledge graph. The operations of method 800 may generate one or more vector functions representing a relationship between each one of the plurality of entities in the knowledge graph.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for providing a continuous knowledge graph in a computing system by a processor to discover new insights from knowledge graphs via utilization of link prediction to detect likely yet previously unknown relationships between entities based upon existing relationships, the method comprising:

receiving heterogeneous data regarding a knowledge graph, the knowledge graph having a plurality of entities and one or more edges, the edges representing relationships between the plurality of entities in the knowledge graph;

training an artificial intelligence model utilizing the heterogenous data, training the artificial intelligence model involving optimizing a loss function, the loss function associated with an underlying distribution of training data associated with the heterogenous data in the knowledge graph;

predicting using the trained artificial intelligence model one or more weighted values of an edge between a pair of entities in a knowledge graph based on one or more candidate statements, each edge associated with a label signifying a particular relationship represented by the edge;

generating using the trained artificial intelligence model a confidence score for the one or more predicted weighted values; and defining the one or more weighted values to represent a predicted, unknown relationship between the pair of entities in the knowledge graph based on existing weighted relationships between one or more of a plurality of entities in the knowledge graph and the predicted weighted values.

2. The method of claim 1, further including selecting the one or more weighted values of the edge between the pair of entities having a maximum confidence score based on the one or more candidate statements.

3. The method of claim 1, further including analyzing metadata between a plurality of entities in the knowledge graph, wherein the metadata includes numerical weights of each of the plurality of entities in the knowledge graph.

4. The method of claim 1, further including incorporating numerical weights of one or more of the plurality of entities in the knowledge graph into knowledge graph embeddings ("KGE"), wherein embedding the numerical weights of the one or more of the plurality of entities of the knowledge graph includes embedding the plurality of entities and relationships into continuous vector spaces.

5. The method of claim 1, further including generating one or more vector functions for each one of a plurality of entities in the knowledge graph.

6. The method of claim 1, further including generating one or more vector functions representing a relationship between each one of a plurality of entities in the knowledge graph.

7. A system for providing a continuous knowledge graph in a computing environment to discover new insights from knowledge graphs via utilization of link prediction to detect likely yet previously unknown relationships between entities based upon existing relationships, comprising:

one or more computers with executable instructions that when executed cause the system to:

receive heterogeneous data regarding a knowledge graph, the knowledge graph having a plurality of entities and one or more edges, the edges representing relationships between the plurality of entities in the knowledge graph;

train an artificial intelligence model utilizing the heterogenous data, training the artificial intelligence model involving optimizing a loss function utilizing negative statements generated from converted training data while tuning hyperparameters;

predict using the trained artificial intelligence model one or more weighted values of an edge between a pair of entities in a knowledge graph based on one or more candidate statements, each edge associated with a label signifying a particular relationship represented by the edge;

generate using the trained artificial intelligence model a confidence score for the one or more predicted weighted values; and defining the one or more weighted values to represent a predicted, unknown relationship between the pair of entities in the knowledge graph based on existing weighted relationships between one or more of a plurality of entities in the knowledge graph and the predicted weighted values.

8. The system of claim 7, wherein the executable instructions when executed cause the system to select the one or more weighted values of the edge between the pair of entities having a maximum confidence score based on the one or more candidate statements.

9. The system of claim 7, wherein the executable instructions when executed cause the system to analyze metadata between a plurality of entities in the knowledge graph, wherein the metadata includes numerical weights of each of the plurality of entities in the knowledge graph.

10. The system of claim 7, wherein the executable instructions when executed cause the system to incorporate numerical weights of one or more of the plurality of entities in the knowledge graph into knowledge graph embeddings ("KGE"), wherein embedding the numerical weights of the one or more of the plurality of entities of the knowledge graph includes embedding the plurality of entities and relationships into continuous vector spaces.

11. The system of claim 7, wherein the executable instructions when executed cause the system to generate one or more vector functions for each one of a plurality of entities in the knowledge graph.

12. The system of claim 7, wherein the executable instructions when executed cause the system to generate one or more vector functions representing a relationship between each one of a plurality of entities in the knowledge graph.

13. A computer program product for providing a continuous knowledge graph in a computing environment to discover new insights from knowledge graphs via utilization of link prediction to detect likely yet previously unknown relationships between entities based upon existing relationships, the computer program product comprising:

one or more computer readable storage media, and program instructions collectively stored on the one or more computer readable storage media, the program instruction comprising:

program instructions to receive heterogeneous data regarding a knowledge graph, the knowledge graph having a plurality of entities and one or more edges, the edges representing relationships between the plurality of entities in the knowledge graph;

program instructions to convert training data taken from the heterogenous data into triples;

program instructions to train an artificial intelligence model utilizing the training data taken from the heterogenous data, training the artificial intelligence model involving optimizing a loss function while tuning hyperparameters;

program instructions to predict using the trained artificial intelligence model one or more weighted values of an edge between a pair of entities in a knowledge graph based on one or more candidate statements, each edge associated with a label signifying a particular relationship represented by the edge;

program instructions to generate a confidence score for the one or more predicted weighted values; and program instructions to define the one or more weighted values to represent a predicted, unknown relationship between the pair of entities in the knowledge graph based on existing weighted relationships between one or more of a plurality of entities in the knowledge graph and the predicted weighted values.

14. The computer program product of claim 13, further including program instructions to select the one or more weighted values of the edge between the pair of entities having a maximum confidence score based on the one or more candidate statements.

15. The computer program product of claim 13, further including program instructions to:

analyze metadata between a plurality of entities in the knowledge graph, wherein the metadata includes numerical weights of each of the plurality of entities in the knowledge graph; and incorporate the numerical weights of one or more of the plurality of entities in the knowledge graph into knowledge graph embeddings ("KGE"), wherein embedding the numerical weights of the one or more of the plurality of entities of the knowledge graph includes embedding the plurality of entities and relationships into continuous vector spaces.

16. The computer program product of claim 13, further including program instructions to generate one or more vector functions for each one of a plurality of entities in the knowledge graph.

17. The computer program product of claim 13, further including program instructions to generate one or more vector functions representing a relationship between each one of a plurality of entities in the knowledge graph.

* * * * *